United States Patent [19]

McEwen

[11] Patent Number: 5,338,443
[45] Date of Patent: Aug. 16, 1994

[54] FILTER MEDIA TENSIONING DEVICE

[75] Inventor: Scott M. McEwen, Bowling Green, Ohio

[73] Assignee: Henry Filters, Inc., Bowling Green, Ohio

[21] Appl. No.: 905,445

[22] Filed: Jun. 29, 1992

[51] Int. Cl.⁵ ............... B01D 29/96; B01D 33/04; B01D 33/056
[52] U.S. Cl. .................. 210/91; 210/143; 210/387; 210/416.1; 210/416.5
[58] Field of Search ............ 210/111, 386, 387, 400, 210/401, 416.1, 416.5, 91, 167, 168, 143

[56] References Cited

U.S. PATENT DOCUMENTS

| | | | |
|---|---|---|---|
| 2,876,904 | 3/1959 | Fowler | 210/387 |
| 3,075,647 | 1/1963 | Davis | 210/401 |
| 3,219,188 | 11/1965 | Hirs . | |
| 3,305,094 | 2/1967 | Casson | 210/387 |
| 3,307,704 | 3/1967 | Pashaian . | |
| 3,364,662 | 1/1968 | Revell . | |
| 3,506,128 | 4/1970 | Pashaian . | |
| 3,722,682 | 3/1973 | Pistiner | 210/387 |
| 3,743,100 | 7/1973 | Bahr . | |
| 3,838,006 | 9/1974 | Davis | 210/387 |
| 3,896,030 | 7/1975 | Bahr . | |
| 4,055,497 | 10/1977 | Creps | 210/91 |
| 4,111,801 | 9/1978 | Jay . | |
| 4,142,971 | 3/1979 | Le Fur . | |
| 4,145,288 | 3/1979 | Crowe | 210/401 |
| 4,147,635 | 4/1979 | Crowe | 210/401 |
| 4,774,010 | 9/1988 | Bratten | 210/803 |

FOREIGN PATENT DOCUMENTS

| | | |
|---|---|---|
| 32829 | 7/1981 | European Pat. Off. . |
| 33603 | 8/1981 | European Pat. Off. . |
| 2639493 | 7/1978 | Fed. Rep. of Germany . |
| 3822485 | 1/1989 | Fed. Rep. of Germany . |
| 398261 | 2/1974 | U.S.S.R. . |
| 1414420 | 7/1988 | U.S.S.R. . |
| 1114462 | 5/1968 | United Kingdom . |
| 1124933 | 8/1968 | United Kingdom . |
| 1124963 | 8/1968 | United Kingdom . |
| 1128061 | 9/1968 | United Kingdom . |
| 1146170 | 3/1969 | United Kingdom . |
| 2066094 | 7/1981 | United Kingdom . |

*Primary Examiner*—Thomas M. Lithgow
*Attorney, Agent, or Firm*—Brooks & Kushman

[57] ABSTRACT

An improved media filtration apparatus includes an upper tank for holding dirty liquid and a lower filtrate compartment for receiving liquid from the upper tank through a filter media. A guide roller mounted above the tank guides the filter media downwardly into the tank. A filter media feed mechanism mounting a roll of filter media is mounted adjacent the guide roller. The filter media feed mechanism includes a brake mechanism for stopping and releasing the feed mechanism. A rotatable tension roller movably mounted for generally vertical movement in a range of motion between the feed mechanism and the guide roller is cooperably connected to the brake mechanism for actuating the stopping and subsequent releasing of the feed mechanism and filter media. The brake mechanism is actuable by the rotatable tension roller to release filter media as the tension roller moves upwardly to an upper limit of its range of motion and the brake mechanism is applied as the tension roller moves downwardly to a lower limit of its range of motion.

6 Claims, 2 Drawing Sheets

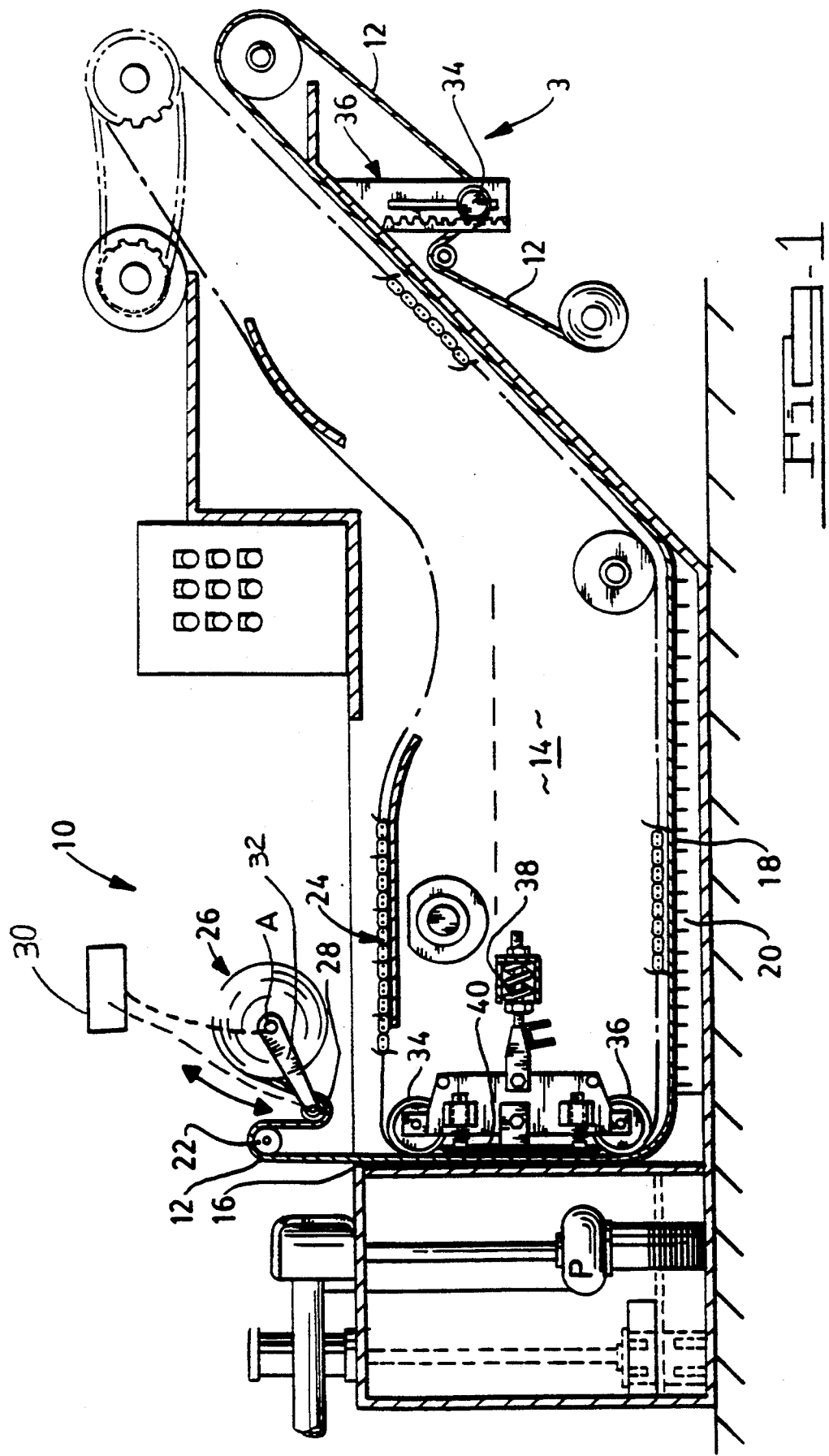

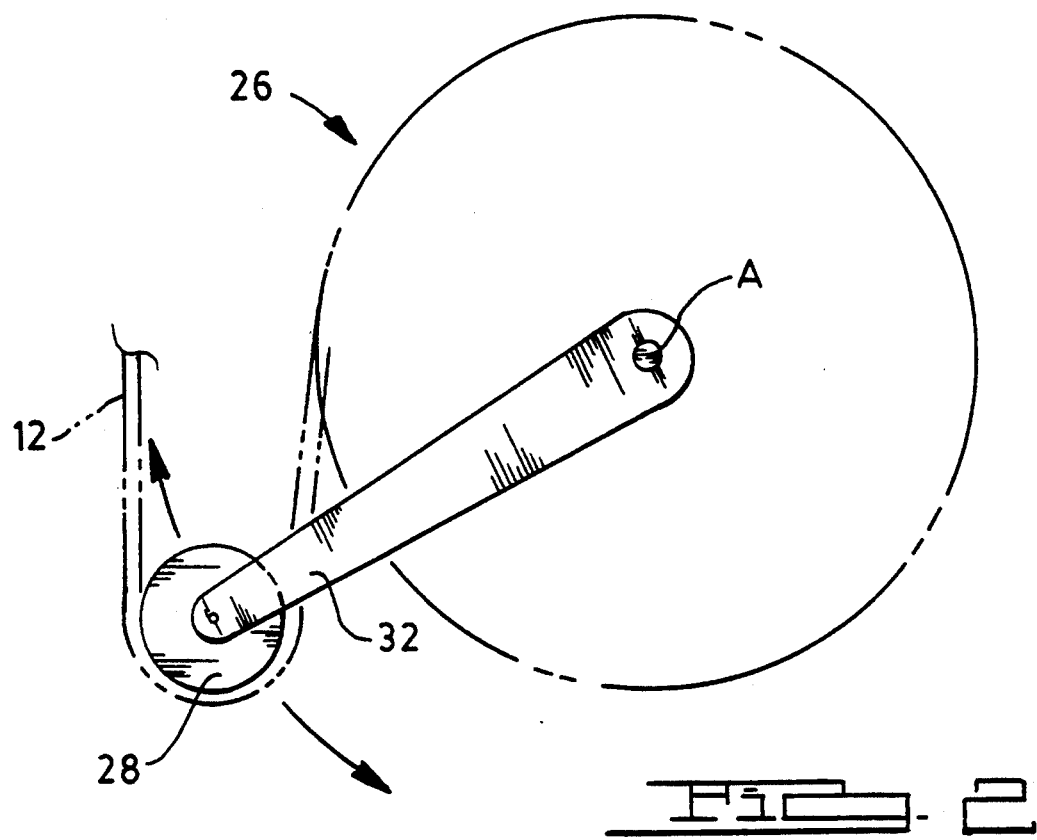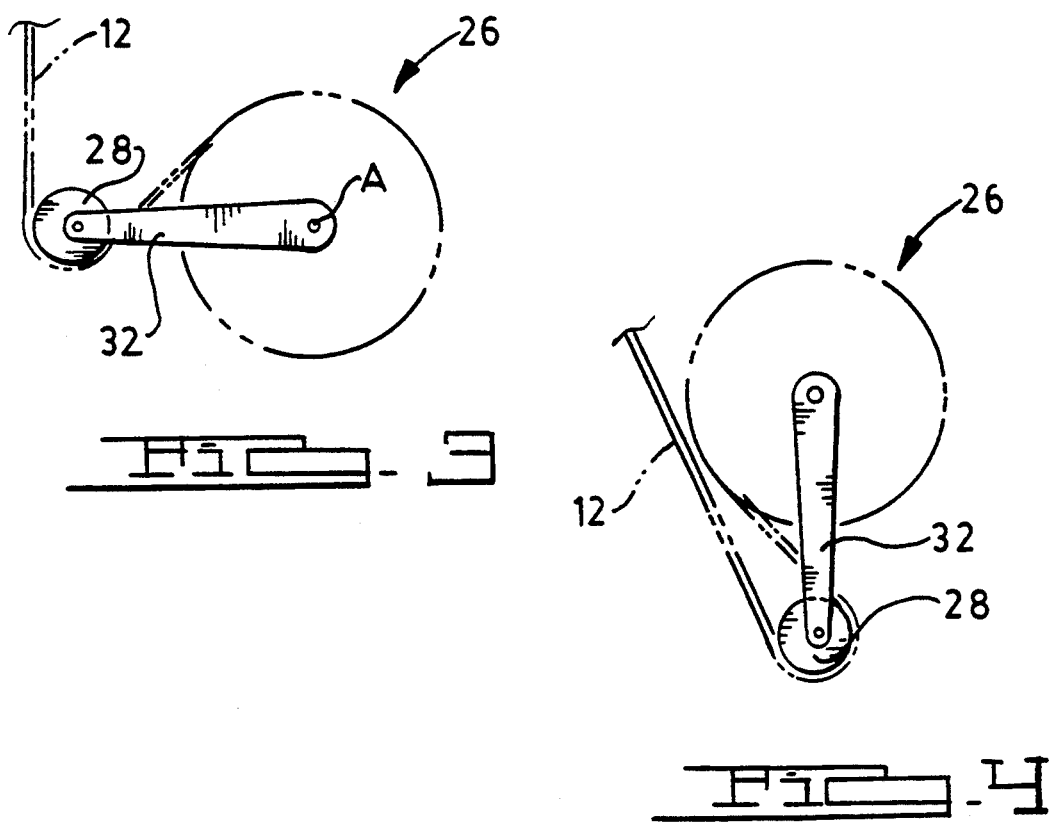

FILTER MEDIA TENSIONING DEVICE

TECHNICAL FIELD

The present invention relates to media filters of the type including a filter tank divided horizontally into an upper dirty liquid tank and a lower filtrate compartment beneath a filter media interposed between the tank and compartment wherein a conveyor is utilized to move the filter media, and more particularly, to an improved media filter filtration apparatus including a device for providing constant tension on filter media received in the tank.

BACKGROUND ART

U.S. Pat. No. 4,761,226, assigned to the assignee of the present invention, discloses a media filter filtration apparatus having an upper filter tank. The upper tank includes a perforate floor provided with a lower filtrate compartment covered with a filter media. The lower compartment is connected to the intake of a pump. The filter media, either a paper web or a fibrous filter aid, is supplied from a roll of the media and moved downwardly along an end wall of the tank and across the floor where the media is indexed by a conveyor. The filter media is moved and subsequently removed when contaminated by advancing the conveyor after any vacuum is relieved. A take-up mechanism is operated in connection with the indexing of the media to take-up the contaminated filter media.

In this arrangement, the filter media is unrolled each time the conveyor indexes. As the conveyor is started, the tension on the filter media causes the filter media to be unrolled. However, when the conveyor stops, the unrolling action of the media roll continues until frictional forces overcome the momentum of the unrolling action, whereby the media can become billowed before it is fed into the tank.

SUMMARY OF THE INVENTION

An object of the present invention is to provide an improved media filter filtration apparatus wherein the filter media is maintained in constant tension as it is fed into the apparatus.

Another object of the invention is to provide an improved media filter filtration apparatus having a device for keeping the filter media flat and preventing billowing.

A more specific object of the invention is carried out in an improved filtration apparatus including an upper tank for holding dirty liquid. Such a tank has an imperforate end wall and a perforate floor. A lower filtrate compartment beneath the floor receives liquid from the upper tank through the perforate floor and through filter media disposed between the upper tank and perforate floor.

The filter media is moved downwardly over a guide roller and positioned to guide the filter media along the end wall and along the floor for filtering out contaminants as the dirty liquid is received from the tank into the filtrate compartment. A conveyor moves the filter media within the upper tank. Such a filtration apparatus is disclosed in detail in U.S. Pat. No. 4,761,226 which is herein incorporated by reference.

The improvement includes a filter media feed mechanism having an axis of rotation for mounting the roll of filter media adjacent the guide roller. The feed mechanism is mounted above the upper tank and a rotatable tension roller is movably mounted between the feed mechanism and the guide roller to provide constant tension on the filter media being moved. A brake mechanism cooperably connected to the filter media feed mechanism and the rotatable tension roller operates to stop and release the filter media roll.

The brake mechanism is actuable by the rotatable tension roller to release the filter media as the tension roller moves upwardly to an upper limit of its range of motion. The brake mechanism is reapplied as the tension roller moves downwardly to a lower limit of its range of motion.

A linkage connects the tension roller to the feed mechanism about its axis of rotation whereby the tension roller movement is arcuate and in a generally vertical direction. Preferably, the tension roller is sufficiently weighted to cooperate with the dispensing of filter media from the filter media roll.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a sectional elevational view of a media filter filtration apparatus constructed in accordance with the present invention; and FIGS. 2–4 are enlarged elevational views of a device for maintaining constant tension of the filter media as it is fed into the filtration apparatus.

BEST MODE FOR CARRYING OUT THE INVENTION

With reference to FIG. 1 of the drawings, an improved filtration apparatus is generally indicated by reference numeral 10 and is used for filtering contaminants out of dirty liquid. As is hereinafter more fully described, the improved filtration apparatus 10 utilizes a disposable filter media 12 such as a paper web or a fibrous filter aid to collect contaminant.

As shown in FIG. 1, the filtration apparatus 10 includes an upper tank 14 for holding dirty liquid. The upper tank 14 has an imperforate end wall 16 and a perforate floor 18. A lower filtrate compartment 20 is located beneath the perforate floor 18 and receives liquid from the upper tank through the perforate floor. The filter media 12 is interposed between the upper tank 14 and perforate floor 18 to capture and retain contaminant from the dirty liquid being communicated from the upper tank 14 into the lower filtrate compartment 20.

A guide roller 22 is mounted above the upper tank 14. The filter media is guided over guide roller 22 and moved downwardly into the tank. Guide roller 22 guides the filter media 12 along the end wall 16 and along the floor 18 for filtering out contaminants as the dirty liquid is received from the tank 14 into the filtrate compartment 20.

As seen in FIG. 1, an endless chain and slat conveyor 24 is operable to index the filter media 12 within the upper tank 14 downwardly along the imperforate wall 16 and along the perforate floor 18.

With further reference to FIG. 1 and with reference to FIGS. 2–4, a roll of filter media 12 is mounted on a filter media feed mechanism 26 which is mounted adjacent the guide roller 22. Filter media feed mechanism 26 has an axis of rotation A and is mounted above the upper tank 14. A rotatable tension roller 28 is movably mounted for generally vertical movement in a range of motion, best seen in FIGS. 2–4, between the feed mechanism 26 and the guide roller 22 to provide constant tension on the filter media 12 being moved by the chain and slat conveyor 24. Preferably tension roller 28 is of sufficient weight or is weighted to increase its effectiveness as a tension provider.

A brake mechanism 30 is cooperably connected to the filter media feed mechanism 26 and tension roller 28 for stopping and releasing filter media 12. Preferably, the brake mechanism 30, shown schematically in FIG. 1, is a conventional disc or drum brake assembly in combination with the feed mechanism 26. Dashed lines are shown in FIG. 1 representing the interconnection between brake mechanism 30 and filter media feed mechanism 26 and tension roller 28.

The brake mechanism 30 is actuable by the tension roller 28 to release filter media 12 as the tension roller moves upwardly to an upper limit of its range of motion. The brake mechanism 30 is then applied as the tension roller 28 moves downwardly to a lower limit of its range of motion. This system provides a manual means of properly tensioning the roll of filter media 12 as it is fed into upper tank 14.

In this case, the weighted tension roller 28 provides constant tension on the filter media 12 being fed into the apparatus 10. As the chain and slat conveyor 24 indexes, a new section of filter media 12 is drawn into the upper tank 14 and the weighted tension roller 28 begins to move up. When the tension roller 28 moves up far enough, the brake mechanism 30 is released on the feed mechanism 26 to allow the roll of filter media 12 to feed the apparatus 10 as required. When the conveyor 24 stops indexing, the tension roller 28 moves down and the brake mechanism 30 is reapplied. This action ensures that the filter media 12 is kept flat as it is drawn into the filtration apparatus 10 and prevents billowing of the filter media 12 between flights of the conveyor that can allow chip migration.

With further reference to FIGS. 2–4 of the drawings, preferably a linkage 32 connects the tension roller 28 to the feed mechanism 26 about its axis A. This provides a simple mounting arrangement of the tension roller 28 wherein its movement is arcuate and in a generally vertical direction.

While the best mode for carrying out the invention has been described in detail, those familiar with the art to which this invention relates will recognize various alternative designs and embodiments for practicing the invention as defined by the following claims.

What is claimed is:

1. In an improved filtration apparatus including an upper tank for holding dirty liquid and having an imperforate end wall and a perforate floor, and a lower filtrate compartment beneath the floor for receiving liquid from the upper tank through said perforate floor, filter media between said upper tank and said perforate floor, a guide roller over which the filter media is moved downwardly and positioned to guide the filter media along the end wall and along the floor for filtering out contaminants as the dirty liquid is received from the tank into the filtrate compartment, and means for moving the filter media, wherein the improvement comprises:

a filter media feed mechanism having an axis of rotation and mounting a roll of filter media adjacent said guide roller, said feed mechanism being mounted relative to the upper tank;

a rotatable tension roller and means to position said tension roller for providing a constant tension, the tension roller movably mounted for generally vertical movement in a range of motion between said feed mechanism and the guide roller thereby to provide constant tension on the filter media being moved; and a brake mechanism means cooperably connected to said filter media feed mechanism and rotatable tension roller for stopping and releasing filter media; said brake mechanism means being actuable by the rotatable tension roller to release filter media as said tension roller moves upwardly to an upper limit of its range of motion and said brake mechanism being applied as said tension roller moves downwardly to a lower limit of its range of motion.

2. The improvement of claim 1 wherein the means to position said tension roller includes a linkage connecting said tension roller to said feed mechanism about its axis of rotation whereby said tension roller movement is arcuate and in a generally vertical direction.

3. The improvement of claim 1 wherein means for moving the filter media is a chain and slat conveyor operable to index the filter media.

4. The improvement of claim 1 wherein said brake mechanism means is a drum brake assembly.

5. The improvement of claim 1 wherein said brake mechanism means is a disc brake assembly.

6. In an improved filtration apparatus including an upper tank for holding dirty liquid and having an imperforate end wall and a perforate floor, and a lower filtrate compartment beneath the floor for receiving liquid from the upper tank through said perforate floor, filter media between said upper tank and said perforate floor, a guide roller over which the filter media is moved downwardly and positioned to guide the filter media along the end wall and along the floor for filtering out contaminants as the dirty liquid is received from the tank into the filtrate compartment, and means for moving the filter media, wherein the improvement comprises:

a filter media feed mechanism for feeding filter media into the upper tank; said feed mechanism having an axis of rotation and mounting a roll of filter media adjacent said guide roller; said feed mechanism including a brake mechanism for stopping said feed mechanism and being mounted relative to the upper tank;

a rotatable tension roller movably mounted for generally vertical movement in a range of motion between said feed mechanism and the guide roller; means cooperably connecting said tension roller to said brake mechanism for actuating the stopping and subsequent releasing of the filter media; said brake mechanism being actuable by the cooperably connecting means to release filter media as said tension roller moves upwardly to an upper limit of its range of motion and said brake mechanism being applied as said tension roller moves downwardly to a lower limit of its range of motion.

* * * * *